A. PROSEUS.
Grinding Mill.

No. 22,580. Patented Jan. 11, 1859.

Witnesses.
Henry Howson.
Henry Odiorne

Inventor.
Alfred Proseus

UNITED STATES PATENT OFFICE.

ALFRED PROSEUS, OF PHILADELPHIA, PENNSYLVANIA.

IMPROVEMENT IN GRINDING-MILLS.

Specification forming part of Letters Patent No. 22,580, dated January 11, 1859.

*To all whom it may concern:*

Be it known that I, ALFRED PROSEUS, of the city and county of Philadelphia, and State of Pennsylvania, have invented a new and useful Improvement in Grinding-Mills; and I do hereby declare the following to be a full, clear, and exact description of the same, reference being had to the accompanying drawings, and to the letters of reference marked thereon.

My invention relates to an improvement in that class of metal grinding-mills which consist of conical shells and burrs, with teeth on their grinding surfaces; and my improvement consists in placing across the recesses formed by the teeth of the shell or those on the burr, or both, small obstructing-strips, as fully described hereinafter, so as to prevent the material from passing from the mill before it is sufficiently ground, which frequently takes place in grinding-mills of this class.

In order to enable others to make and use my invention, I will now proceed to describe its construction and operation.

Figure 1:
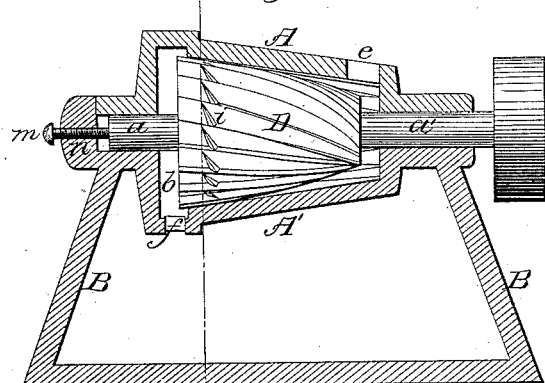
Figure 2:
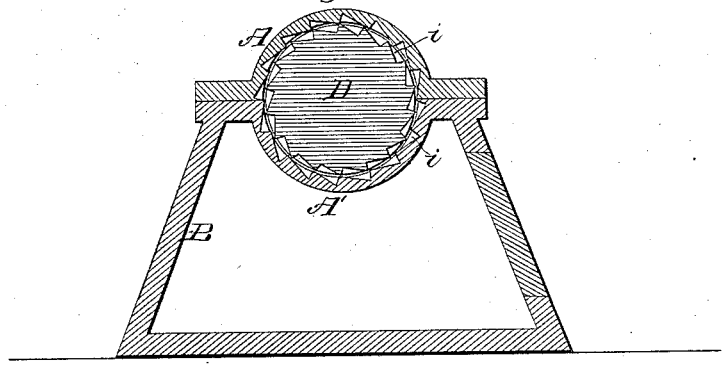
Figure 3:
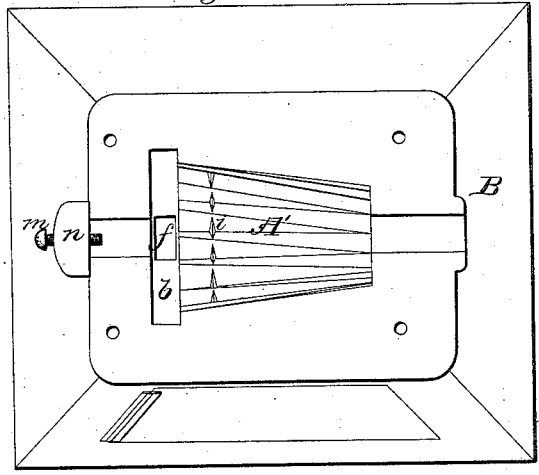

On reference to the accompanying drawings, which form a part of this specification, Figure 1 represents a sectional elevation of the shell and an exterior view of the burr of a grinding-mill; Fig. 2, a transverse section on the line 1 2, Fig. 1; Fig. 3, a ground plan with the upper half of the shell and the burr removed.

Similar letters refer to similar parts throughout the several views.

The shell of the mill is made in two halves, A and A', bolted together, the lower half being secured to the top of the box B, which forms a receptacle for the ground material.

D is the burr, the journals $a$ and $a'$ of which turn in bearings formed at the opposite ends and between the two halves of the shell. Each half of the latter forms a tapering concave, with a recess, $b$, at the larger end for the reception of the ground material prior to its falling through the opening $f$ in the lower half of the shell into the box below. The whole interior of the two halves of the shell, with the exception of the above-mentioned recess, is divided into teeth which take a slightly-angular direction from one end to the other. The burr D is of a tapering form but slightly rounded, so that while its large end may fit accurately to the enlarged end of each half of the shell there may be a space gradually increasing in size from the larger to the smaller end between the grinding-surfaces of the shell and the burr.

An opening, $e$, in the upper half and at the small end of the shell admits the material to be ground, and a stud, $m$, screwing into a projection, $n$, on the lower half and at the enlarged end of the shell, serves to set up the mill when the grinding-surfaces become worn.

As far as regards the above-described parts of the mill, they differ but little from others in common use for grinding corn, grain, and other substances. There is one great defect in this class of horizontal conical mills which has heretofore prevented them from coming into general use for farm and family purposes as cheap substitutes for the ordinary burr mills. When new, conical grinding-mills will work admirably, producing the finest class of flour. This is owing to the angular recesses between the teeth having their surfaces rough. This rough surface prevents the material as it is being ground from being forced too rapidly along the grooves, thus retaining the material long enough between the grinding-surfaces to allow it to be freely triturated. After these mills have been used for some time, however, the constant passage of the material along the grooves wears them smooth, so that with the assistance of the spirally-formed teeth of the burrs the material is pushed rapidly along the grooves and passes out at the end of the mill without being sufficiently ground. To obviate this defect, I place across the angular recesses and between the edges of the teeth of the burr or the shell, or both, small strips $i\ i$, the tops of which are a short distance below the cutting-edges of the teeth. I prefer to place these strips near the enlarged end of the shell and burr, as at this point the finer grinding takes place.

Now it will be evident that, however smooth the recesses between the teeth may be worn, the material, partially triturated before it reaches the obstructions, must, when brought in contact with the latter, be suddenly arrested in its passage and crowded at the obstructions to such an extent as to cause a delay, which allows the insufficiently-ground particles to be thoroughly triturated before they can pass over the obstructions.

In grinding some materials it may be necessary to have a single row of obstructions round the burr only, the teeth of the shell being clear. For other materials the obstructions will be required on both the shell and burr, and in some instances two or three belts of obstructing-strips may be used to advantage.

Without confining myself, therefore, to the exact form or position of the strips illustrated and described, I claim and desire to secure by Letters Patent—

Placing across the recesses formed by the teeth of the shells or of those of the burrs, or of both, of conical grinding-mills any convenient number of obstructing-strips, as and for the purpose herein set forth.

In testimony whereof I have signed my name to this specification in the presence of two subscribing witnesses.

ALFRED PROSEUS.

Witnesses:
ANDW. E. BOSWELL,
J. M. REAZOR.